United States Patent [19]

Van Horbek

[11] 4,065,107
[45] Dec. 27, 1977

[54] APPARATUS FOR MIXING LIQUIDS

[76] Inventor: Judd Van Horbek, Box 884, El Granada, Calif. 94018

[21] Appl. No.: 736,711

[22] Filed: Oct. 29, 1976

[51] Int. Cl.$^2$ .............................................. B01F 7/16
[52] U.S. Cl. .................................. 366/343; 366/328; 366/605
[58] Field of Search ....... 259/182, DIG. 38, DIG. 10, 259/DIG. 11, 106, 107, 108, 111, 114

[56] References Cited

U.S. PATENT DOCUMENTS

| 628,073 | 7/1899 | Cornelius | 259/107 |
|---|---|---|---|
| 861,603 | 7/1907 | Newton | 259/182 X |
| 1,281,610 | 10/1918 | Lundahl | 259/DIG. 38 |
| 2,027,297 | 1/1936 | Tramposch | 259/DIG. 38 |
| 2,520,577 | 8/1950 | Tooley | 259/107 X |

Primary Examiner—Edward J. McCarthy
Attorney, Agent, or Firm—Warren M. Becker

[57] ABSTRACT

An apparatus for mixing liquids by hand is described comprising a handle having an upper and a lower portion. Extending from the lower portion is slotted mixing blade means and terminating the lower portion there is provided a salient surface for preventing the slotted blade means from rubbing against an underlying surface and for reducing friction between the apparatus and the surface when the apparatus is placed against and rotated about a line perpendicular to the surface.

7 Claims, 10 Drawing Figures

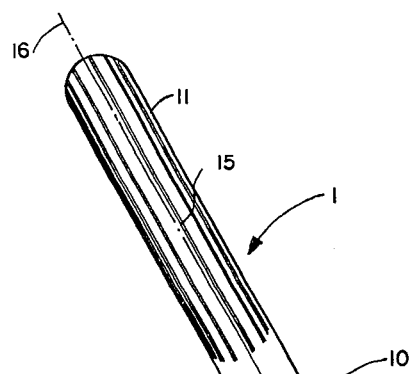
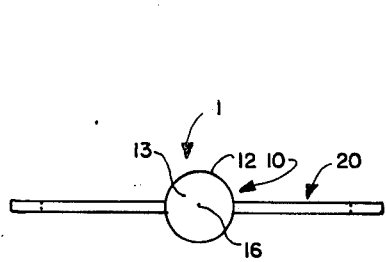
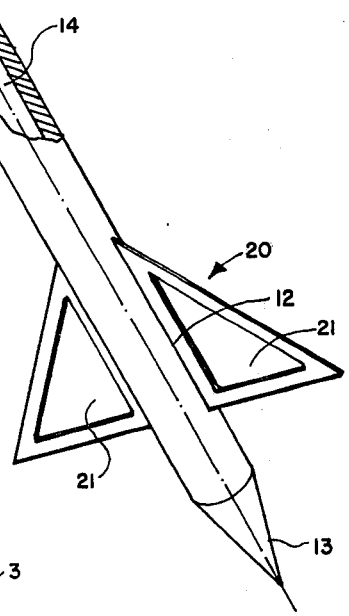
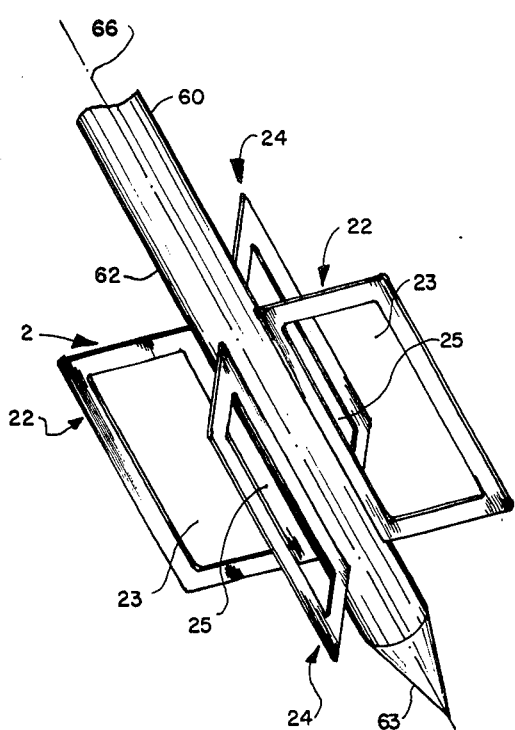
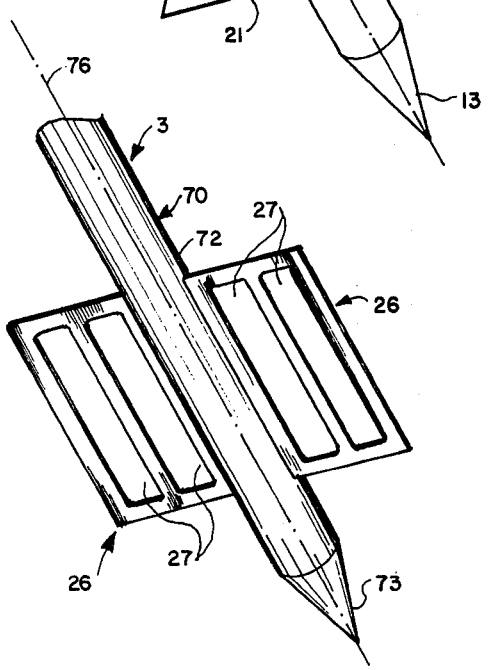
FIG. 1
FIG. 2
FIG. 3
FIG. 4

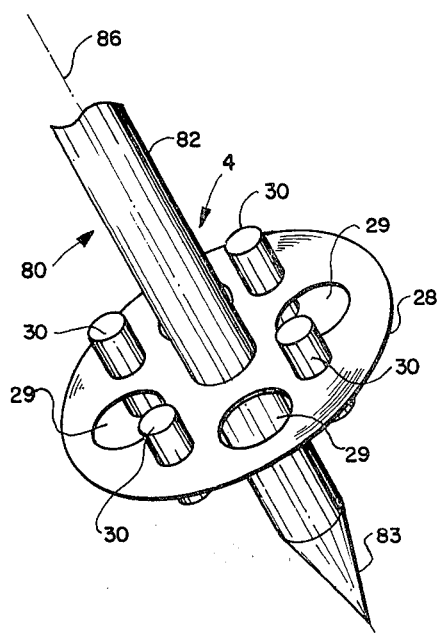
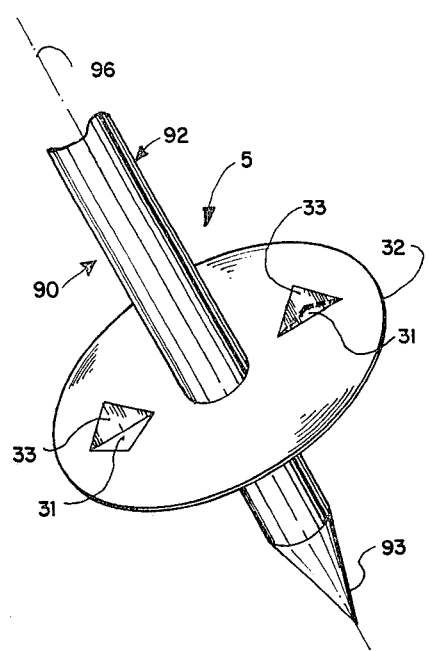
FIG. 5
FIG. 6
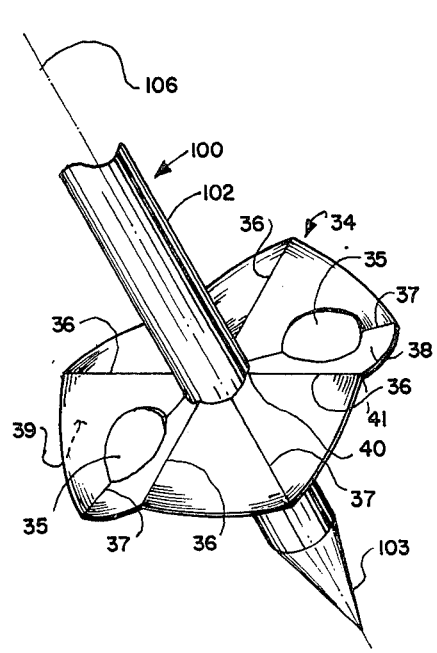
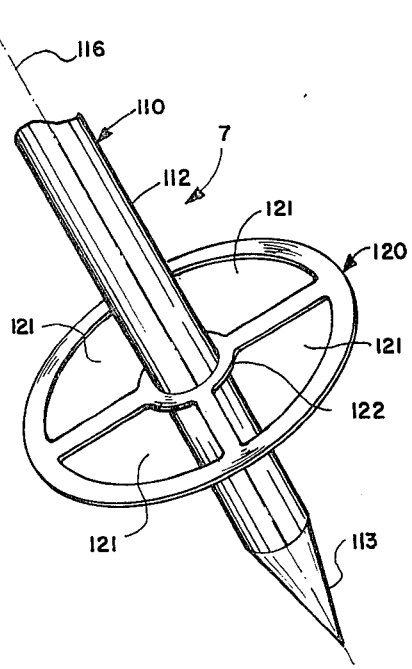
FIG. 7
FIG. 8

4,065,107

APPARATUS FOR MIXING LIQUIDS

BACKGROUND OF THE INVENTION

The present invention relates to an apparatus for mixing liquids. The liquids may be either hot or cold. In particular, this invention is directed to an improved apparatus which reduces the amount of energy required to mix a liquid in a container, such as a bucket or drum. The use of simple paddles or sticks to mix liquids is well known, but is generally laborious and time consuming.

Improvements upon the simple paddle or stick have been made. For example, Lundahl (see U.S. Pat. No. 1,281,610) discloses a paint-mixing tool having a handle and a blade having a specific configuration designed to be rotated between the palms of the user. The blade of Lundahl's tool is designed to mix paint and, in addition, it may be used to open paint cans by cutting the top away and to scrape. The addition of the cutting and scraping functions to the mixing blade requires a more rugged design, which increases the weight of the blade, the manufacturing costs and the friction between the bottom of the blade and the bottom of the container in which the mixing is being done.

It is an object of the present invention to provide an improved, economical apparatus for mixing liquids with a minimum of effort.

These and other objects of the invention will be apparent from the description and claims which follow.

SUMMARY OF THE INVENTION

The present invention relates to an improved apparatus for mixing liquids, comprising a handle having an upper and a lower portion, said lower portion terminating in a salient surface, and one or more slotted mixing blades attached to the lower portion of the handle.

DESCRIPTION OF THE DRAWINGS

FIG. 1 is a side view of one embodiment of an apparatus for mixing liquids.

FIG. 2 is a bottom view of the apparatus of FIG. 1.

FIG. 3 is a partial side view of a first alternative embodiment of an apparatus for mixing liquids.

FIG. 4 is a partial side view of a second alternative embodiment of an apparatus for mixing liquids.

FIG. 5 is a partial side view of a third alternative embodiment of an apparatus for mixing liquids.

FIG. 6 is a partial side view of a fourth alternative embodiment of an apparatus for mixing liquids.

FIG. 7 is a partial side view of a fifth alternative embodiment of an apparatus for mixing liquids.

FIG. 8 is a partial side view of a sixth alternative embodiment of an apparatus for mixing liquids.

DETAILED DESCRIPTION OF THE INVENTION AND DRAWINGS

Figure 9:
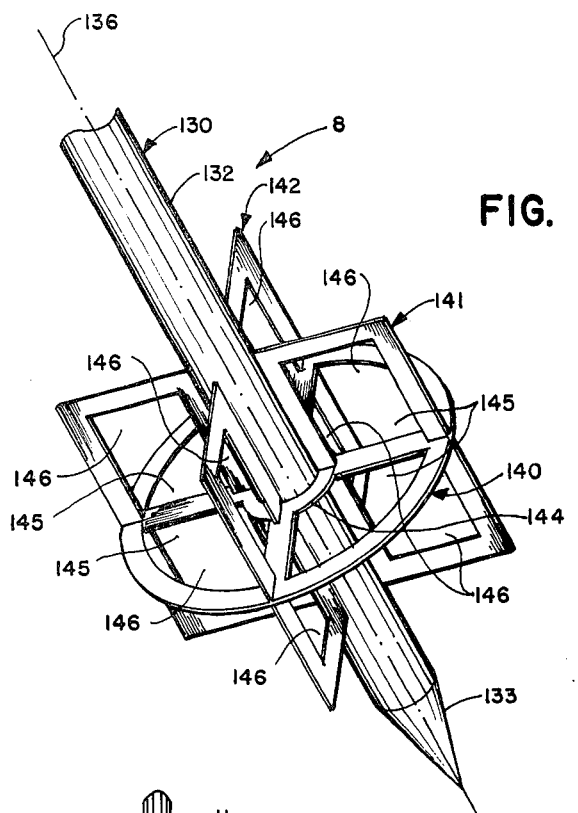
FIG. 9 is a partial side view of a seventh alternative embodiment of an apparatus for mixing liquids.

Referring to FIG. 1, there is provided in an apparatus 1 for mixing liquids according to the present invention a handle 10 with a longitudinal axis 16 and a slotted mixing blade 20. The handle 10 has an upper portion 11 and a lower portion 12. The upper portion 11 contains grooves 15 which act as a friction surface and aid in rotating the handle by hand. The lower portion 12 of the handle 10 terminates in a conical surface 13, which is concentric with the longitudinal axis 16. The handle 10 has a hollow space 14 which is concentric with the longitudinal axis 16 and sealed to prevent liquids from entering the hollow space 14. The mixing blade 20 is attached perpendicular and parallel to the longitudinal axis 16 on the lower portion 12 of the handle 10 in a conventional manner. The slotted mixing blade 20 is planar and triangular. The slotted mixing blade 20 contains a slot 21 on each side of the handle 10, which reduces the amount of effort required to mix the liquid and improves the mixing ability of the blade 20. The longitudinal axis 16 is a straight line passing through the handle 10. The handle 10 is symmetrically arranged around the longitudinal axis 16.

Referring to FIG. 2, there is provided a bottom view of the apparatus 1 of FIG. 1 showing the handle 10 bisected by the slotted mixing blade 20. The slotted mixing blade 20 is bisected by the handle 10. The handle 10 has a lower portion 12 terminating in a conical surface 13. The slotted mixing blade 20 is attached perpendicular and parallel to the longitudinal axis 16 of the handle 10.

Referring to FIG. 3, there is provided, in a partial side view of a second embodiment of an apparatus 2 for mixing liquids, a handle 60 with a longitudinal axis 66, a first slotted mixing blade 22 and a second slotted mixing blade 24. The handle 60 has a lower portion 62. The lower portion 62 terminates in a conical surface 63. The first slotted mixing blade 22 is attached perpendicular and parallel to the longitudinal axis 66 on the lower portion 62 of the handle 60. The second slotted mixing blade 24 is attached perpendicular and parallel to the longitudinal axis 66 of the lower portion 62 of the handle 60. The second slotted mixing blade 24 is perpendicular to the first slotted mixing blade 22. The first slotted mixing blade 22 has a slot 23 on each side of the handle 60. The second slotted mixing blade 24 has a slot 25 on each side of the handle 60. Both slotted mixing blades 22 and 24 are planar and rectangular.

Referring to FIG. 4, there is provided, in a partial side view of a third embodiment of an apparatus 3 for mixing liquids, a handle 70 with a longitudinal axis 76 and a slotted mixing blade 26. The handle 70 has a lower portion 72. The lower portion 72 terminates in a conical surface 73. The slotted mixing blade 26 is attached perpendicular and parallel to the longitudinal axis 76 on the lower portion 72 of the handle 70. The slotted mixing blade 26 has two parallel slots 27 on each side of the handle 70. The slotted mixing blade 26 is planar and rectangular.

Referring to FIG. 5, there is provided, in a partial side view of a fourth embodiment of an apparatus 4 for mixing liquids, a handle 80 with a longitudinal axis 86 and a slotted mixing blade 28. The lower portion 82 terminates in a conical surface 83. The slotted mixing blade 28 is attached perpendicular and concentric to the longitudinal axis 86 on the lower portion 82 of the handle 80. The slotted mixing blade 28 has four circular slots 29 and four vertical deflectors 30. The four circular slots 29 are equal in size and located every ninety degrees at the same distance from the center of the blade 28. The four vertical deflectors 30 are equal in size, are located every 90° between the four circular slots 29 at the same distance from the center of the blade 28 and extend equally above and below the plane of the blade 28. The slotted mixing blade 28 is circular and planar with deflectors 30 projecting above and below the plane.

Referring to FIG. 6, there is provided, in a partial side view of a fifth embodiment of an apparatus 5 for mixing liquids, a handle 90 with a longitudinal axis 96 and a slotted mixing blade 32. The handle 90 has a lower portion 92. The lower portion 92 terminates in a conical surface 93. The slotted mixing blade 32 is attached perpendicular and concentric to the longitudinal axis 96 on the lower portion 92 of the handle 90. The slotted mixing blade 32 has two triangular slots 31 and two triangular flaps 33. The triangular slots 31 are equal in size and located 180° apart at the same distance from the center of the blade 32. The triangular flaps 33 are formed simultaneously with the slots 31 by punching only two sides of the triangular slots 31 and bending the blade material upward at an angle of about fifteen degrees to form the third side of the slots 31 and the flaps 33. The slotted mixing blade 32 is circular and planar with the flaps projecting above the plane.

Referring to FIG. 7, there is provided, in a partial side view of a sixth embodiment of an apparatus 6 for mixing liquids, a handle 100 with a longitudinal axis 106 and a slotted mixing blade 34. The handle 100 has a lower portion 102. The lower portion 102 terminates in a conical surface 103. The slotted mixing blade 34 is attached perpendicular and concentric to the longitudinal axis 106 on the lower portion 102 of the handle 100. The slotted mixing blade 34 has two equal, circular slots 35 located 180° apart at the same distance from the center of the blade 34. The slotted mixing blade 34 is corrugated by eight radial bends which alternate between up and down. The upward radial bends 36 extend from the center 40 of the blade 34 to the perimeter 41 with their ridge or peak extending along the upper surface 38 of the blade 34. The downward radial bends 37 extend from the center 40 of the blade 34 to the perimeter 41, with their valley or trough extending along the lower surface 39 of the blade 34. The upward radial bends 36 alternate with the downward radial bends 37 around the entire blade at intervals of 45°.

Referring to FIG. 8, there is provided, as shown in a partial side view, in a seventh embodiment of the invention, an apparatus 7, for mixing liquids, comprising a handle 110 with a longitudinal axis 116, a lower portion 112 terminating in a conical surface 113, and a slotted mixing blade 120. The slotted mixing blade 120 is circular and planar and is attached perpendicular and concentric to the longitudinal axis 116 on the lower portion 112 of the handle 110. The slotted mixing blade 120 has a central hub 122 and a plurality of slots 121, the slots 121 being equal in size and located every 90° at the same distance from the central hub 122. There are four slots in this embodiment.

Referring to FIG. 9, there is provided, as shown in a partial side view, in an eighth embodiment of the invention, an apparatus 8 for mixing liquids, having a handle 130 with a longitudinal axis 136, a lower portion 132 terminating in a conical surface 133, and a plurality of slotted mixing blades 140, 141 and 142. The slotted mixing blade 140 is circular and planar and is attached perpendicular and concentric to the longitudinal axis 136 on the lower portion 132 of the handle 130 and has a central hub 144 and a plurality of slots 145. The slots 145 are equal in size, located every 90° and are at the same distance from the central hub 144. The slotted mixing blades 141 and 142 are attached perpendicular and parallel to the longitudinal axis 136 on the lower portion 132 of the handle 130, are planar and rectangular in shape, and have a plurality of slots 146 on each side of the handle 130. The slots 146 are rectangular and equal in size and located at the same distance from the handle 130. The slotted mixing blades 141 and 142 are bisected by the first slotted mixing blade 140 at their midpoint, the slotted mixing blade 140 forming an outer circular ring. There are eight slots in the slotted mixing blades 141 and 142 and four slots in the first slotted mixing blade 140.

Figure 10:
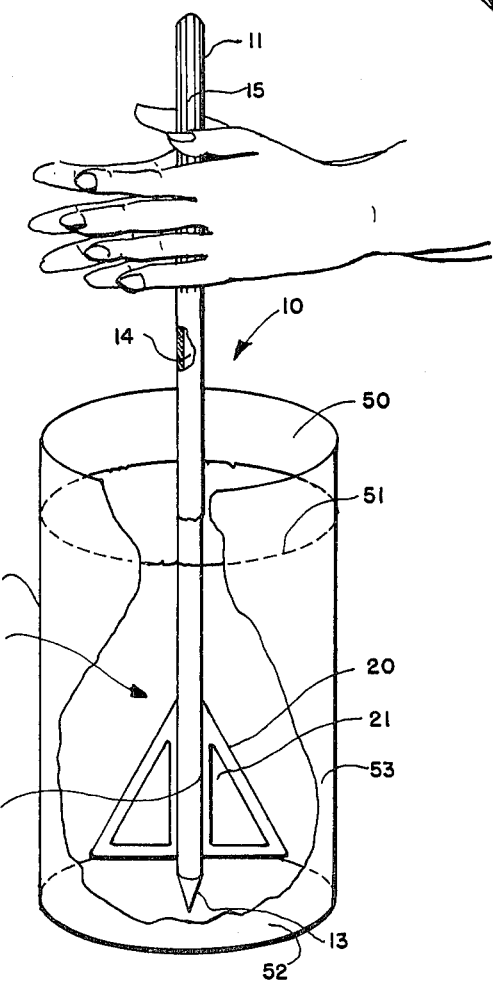
FIG. 10 is a side view of the apparatus of FIG. 1 being used to mix a liquid by hand.

Referring now to FIG. 10, the apparatus 1 is shown mixing a liquid 53 in an open container 54. The apparatus 1 is inserted through the opening 50 of the container and into the liquid 53 until the conical surface 13 of the lower portion 12 of the handle 10 rests on the bottom 52 of the container 54. The hands of the user are placed on the upper portion 11 of the handle 10 where the friction surface 15 enables the user to rapidly and easily rotate the apparatus 1. The mixing blade 20 should be kept under the surface 51 of the liquid 53 to maximize mixing and minimize splattering. The hollow space 14 gives buoyance to the apparatus 1.

The handle is adapted to the general size of the containers in which the apparatus is to be used. The handle may be hollow or solid. The hollow handle reduces the weight of the apparatus, requires less material when constructed of either a metal or plastic and provides buoyance. When the handle is hollow, it is sealed to prevent any liquid being mixed from entering the hollow space of the handle. The handle may be made out of any suitable material, including wood, metal or plastic.

A cross section of the handle perpendicular to the longitudinal axis is generally circular, but may be oval, triangular, square or rectangular. Generally the upper portion of the handle is circular in cross section, having a diameter of from about $\frac{1}{4}$ to 2 inches. The friction surface is produced in a conventional manner and may be grooved, checkered, dimpled or roughened. When the cross section of the lower portion of the handle is non-circular, it may aid in the mixing of the liquid in the container. The handle generally has a uniform, circular cross section the entire length of the handle. The hollow space is generally circular in cross section, resulting in a cylindrical handle when the cross section of the handle is also circular.

The lower portion of the handle has the slotted mixing blades attached thereto. The slotted mixing blades may be attached in either a temporary or a permanent manner, preferably permanent. When the handle is hollow, the slotted mixing blades should be sealed to the lower portion of the handle to prevent the liquid from entering the hollow space. If the handle is solid, sealing is not required. The lower portion terminates in a salient surface. The salient surface reduces the amount of friction between the terminal end of the lower portion of the handle and the surface at the bottom of the container. The salient surface may be either convex or conical. When the salient surface is conical, the angle of the cone is not critical, and is generally between 15° and 165°. A convex surface is formed by taking an exterior section of a sphere, generally a hemisphere or less.

The slotted mixing blade may be rotated about its plane or one of its major axes, or a combination thereof. The slotted mixing blade which is bisected by the handle may be one piece or two pieces. One or more blades may be attached either perpendicular and parallel to the lower portion of the handle or perpendicular and concentric to the lower portion of the handle. The overall size of the blade is limited by the size of the opening of the container to be used for mixing the liquid. The mixing blade may be made out of any material compatible with the liquid being mixed. Generally the blades are made from metal, plastic or plastic-coated metal. The overall shape of the blades is not critical, and ease of manufacture is a factor in arriving at the final shape.

The shape of the slots in the mixing blade is not critical, and may be of any shape which is readily produced in the manufacture of the blade. The number of slots is not critical and generally is two or more arranged symmetrically so that the blade is in balance. The slots are entirely within the blade and do not communicate with the edge of the blade. These slots may be called inner or internal slots.

The deflectors or flaps may be raised portions of the mixing blade produced by molding or stamping in the manufacturing process for producing the mixing blade, or may be separate parts attached to the mixing blade at some point in the manufacturing process. The number of deflectors or flaps is not critical and generally is two or more arranged so that the blade is in balance. The method of attaching the deflectors or flaps to the circular mixing blade is not critical. The deflectors or flaps may be attached to the upper surface, the lower surface, both surfaces or may extend from the upper surface through the blade to the lower surface of the blade.

The combination of slots and/or deflectors and flaps need not be balanced when the apparatus is used for hand mixing. For power mixing, the apparatus and blade should be balanced. The balancing of the apparatus and blade minimizes the wear and/or damage to the apparatus, blade and power source, caused by the fluctuating load generated by the unbalanced mixing blade and/or apparatus.

The apparatus 1 is used by placing the lower portion 12 of the apparatus containing the mixing blade 20 through the opening 50 of the container 54 and resting the conical surface 13 on the bottom of the container 52 as shown in FIG. 10. The mixing blade is preferably below the surface of the liquid 51 to maximize mixing and minimize splashing of the liquid 53 out of the container 54. The apparatus is rotated about its longitudinal axis 16 to mix the liquid 53. The rotation may be done by hand, as illustrated in FIG. 10, where friction surface 51 of the upper portion 11 of the handle 10 is rotated between the hands. The apparatus 1 may also be rotated by a power source, such as an electric motor connected to the handle in a conventional manner. When a power source is employed, the diameter of the handle may be greater than that used for hand rotation to give the apparatus greater strength or the apparatus may be constructed from materials having greater strength than the apparatus designed to be hand powered. Similarly, apparatus 2, 3, 4, 5, 6, 7 and 8 may be used in the same manner as apparatus 1. The upper portion of the handles of apparatus 2, 3, 4, 5, 6, 7 and 8 were not illustrated in FIGS. 3, 4, 5, 6, 7, 8 and 9 since they were the same as the upper portion of the handle of apparatus 1, illustrated in FIGS. 1, 2 and 10.

While there have been described and pointed out the fundamental features of the invention as applied to the preferred embodiments, those skilled in the art will appreciate that various changes, modifications and omissions from the apparatus may be made without departing from the spirit of the invention. It is the intention, therefore, that the invention be limited only by the scope of the claims which follow.

What is claimed is:

1. An apparatus for mixing liquids, comprising:
    a handle having an upper and a lower portion, said lower portion terminating in a salient surface; and
    one or more slotted mixing blades attached to the lower portion of the handle;
wherein said one or more slotted mixing blades are first, second and third blades, said first slotted mixing blade forms an outer circular ring and is planar with its plane perpendicular to said handle and its center concentric with the center of the handle, and said second and third slotted mixing blades are rectangular and planar, and perpendicular and parallel to the handle, and the second and third blades bisect the handle and the handle bisects the second and third blades, and the first blade forms an outer circular ring.

2. An apparatus for mixing liquids, comprising:
    a handle having an upper and a lower portion, said lower portion terminating in a salient surface; and
    one or more slotted mixing blades attached to the lower portion of the handle;
wherein said one or more slotted mixing blades is one circular mixing blade with its plane perpendicular to said handle and its center concentric with the center of the handle.

3. The apparatus of claim 2 wherein said circular mixing blade has one or more deflectors attached thereto.

4. The apparatus of claim 2 wherein said circular mixing blade has one or more flaps attached thereto.

5. The apparatus of claim 2 wherein said circular mixing blade is corrugated by alternating upward and downward radial bends.

6. An apparatus for mixing liquids, comprising a hollow cylindrical handle sealed in a fluid-tight manner on all surfaces, having an upper and a lower portion, said lower portion terminating in a conical surface, said upper portion having a friction surface so that the handle may be rapidly rotated by hand, and one or more mixing blades attached to the lower portion of the handle, each of said mixing blades containing one or more internal slots.

7. A hand-operated apparatus for mixing comprising:
    an elongated hollow tubular member;
    a friction surface covering a portion of one end of the tubular member for reducing the force which would otherwise be required to rotate the tubular member between a person's palms;
    slotted blade means extending outwardly from a portion near the opposite end of the tubular member; and
    means forming a conically shaped pivot surface terminating the opposite end of the tubular member for preventing the slotted blade means from rubbing against an underlying surface and for reducing friction between the apparatus and the surface when the mixing apparatus is placed against and rotated about a line perpendicular to the surface.

* * * * *